United States Patent [19]
Kurihara et al.

[11] Patent Number: 5,642,200
[45] Date of Patent: Jun. 24, 1997

[54] DUPLEX IMAGE RECORDING APPARATUS WITH MEMORY

[75] Inventors: Susumu Kurihara; Utami Soma; Izumi Hamanaka; Atsushi Takahashi; Kenichi Hosoi; Takanobu Fuse, all of Hachioji, Japan

[73] Assignee: Konica Corporation

[21] Appl. No.: 588,430

[22] Filed: Jan. 18, 1996

[30]       Foreign Application Priority Data

Jan. 23, 1995 [JP] Japan .................................. 7-008206
Feb. 28, 1995 [JP] Japan .................................. 7-065081

[51] Int. Cl.$^6$ .............................. H04N 1/00; H04N 1/04; H04N 1/40; G01J 3/06; G03G 21/00
[52] U.S. Cl. ............................ 358/296; 358/444; 358/498; 399/83; 399/364
[58] Field of Search ................................... 358/296, 401, 358/444, 468, 498; 395/115, 116; 399/83, 364, 365, 373, 374, 381; 355/24, 77

[56]          References Cited

U.S. PATENT DOCUMENTS

| | | | |
|---|---|---|---|
| 4,934,681 | 6/1990 | Holmes et al. | 355/319 X |
| 4,935,786 | 6/1990 | Veeder | 355/319 |
| 5,227,816 | 7/1993 | Forest | 355/308 X |

*Primary Examiner*—Eric Frahm
*Attorney, Agent, or Firm*—Jordan B. Bierman; Bierman, Muserlian and Lucas LLP

[57]          ABSTRACT

An image recording apparatus includes a memory for storing an image information of each page; an image forming device for recording an image onto a recording sheet for each page on the basis of the image information in the memory; a recording sheet conveyor for conveying a recording sheet to the image forming device to record an image on one side thereof, and after that, conveying again the recording sheet to the image forming device to record an image on another side thereof, with no recording sheet being stacked during conveyance, and the recording sheet being conveyed along a specified conveyance path, and a predetermined maximum number of recording sheets can exist within the specified conveyance path. The apparatus further includes a controller for controlling the image forming device and the recording sheet conveyor so that a cycle of an image forming operation corresponding to the maximum number of recording sheets is repeated until a remaining number of pages in the memory to be recorded is less than the maximum number of recording sheets.

15 Claims, 11 Drawing Sheets

[IMAGE DATA]   [PRIOR ART]   [PRESENT EXAMPLE]

FIG. 11 (A)

[IMAGE DATA]

FIG. 11 (B)

[PRIOR ART]

FIG. 11 (C)

[PRESENT EXAMPLE]

DUPLEX IMAGE RECORDING APPARATUS WITH MEMORY

BACKGROUND OF THE INVENTION

The present invention relates to an image recording apparatus, which is provided with an automatic document conveyance means by which a double-sided document can be read, and by which double-sided copying can be performed. Specifically, the present invention relates to an image recording apparatus having a non-stacking type automatic reversing unit.

Recently, copiers of superior copy productivity and operability are being provided on the market. The automatic document conveyance means automatically conveys a document, which is conventionally manually placed one by one in the exposure position on a platen, to the exposure position. An image is formed synchronously with the automatic document conveyance operation to the exposure position. However, due to the spread of digitizing technology and reduction of memory cost, copying operations can now be performed without depending on operations of an automatic document conveyance means, as follows. A memory (an image memory section) is provided in the apparatus; documents are conveyed one by one by an automatic document conveyance means to the exposure position; document information on the exposure position is read by a reading means having a photoelectric conversion means such as a CCD; all the document information is temporarily stored in the memory and image information on the specific page is read from the memory at the time of image formation. Conventionally, when a plurality of copying volumes are copied from a plurality of documents, the automatic document conveyance means circulates the documents plural times so that a plurality of copied volume are obtained. However, when a so-called electronic RDH stored in the memory is adopted in the apparatus, the above described operations are no longer necessary.

Further, recently, many copiers having double-sided copying functions are being provided on the market. That is, automatic document conveyance means by which double-sided documents can be read are provided. On the other hand, relating to copiers, an automatic reversing unit (ADU) is provided in a copier, single-sided copied transfer sheets are not delivered outside the apparatus, and transfer sheets are reversed and conveyed by the ADU in the apparatus, copying of the other side is carried out, and after double-sided copy has been completed, the transferred sheets are delivered outside the apparatus. Relating to ADUs, the following types are provided: a stacking type ADU in which a stacker is provided in the apparatus, and after the transfer sheet, one side of which has been copied, is temporarily stacked on the stacker, the other side is copied; and a non-stacking type ADU in which no stacker is provided in the apparatus, and only a reversing conveyance path is provided. Although the stacking type ADU and the non-stacking type ADU have respective advantages and disadvantages, the non-stacking type ADU has better copy productivity for the electronic RDH.

As described above, image information is stored in a large capacity memory, and can be read from the memory as necessary. Although the non-stacking type image recording apparatus has better copy productivity (in terms of the number of copied sheets per unit of time) than conventional methods of double-sided copying, it was clearly found that copy productivity could be improved still further in following points after further investigation.

Figure 10A:
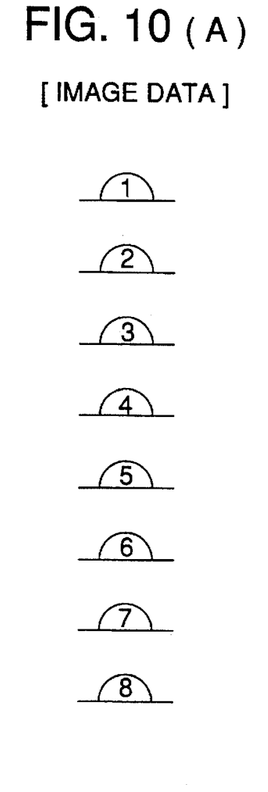
FIGS. 10(A), 10(B) and 10(C) are views comparing the conventional mode to the mode of the example of the present invention when image data is outputted.
Figure 10B:
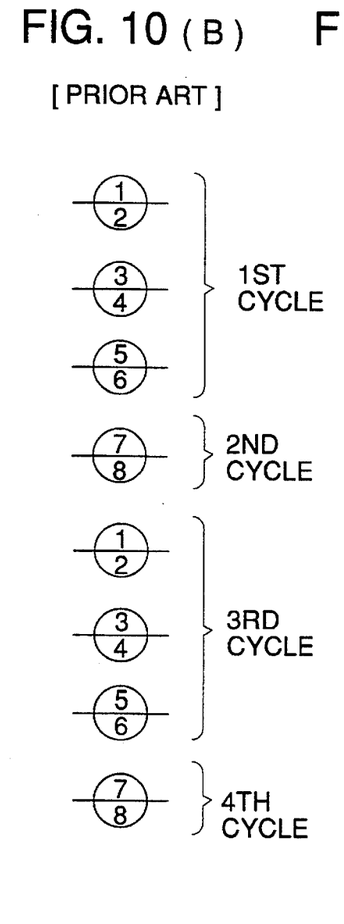
Figure 10C:
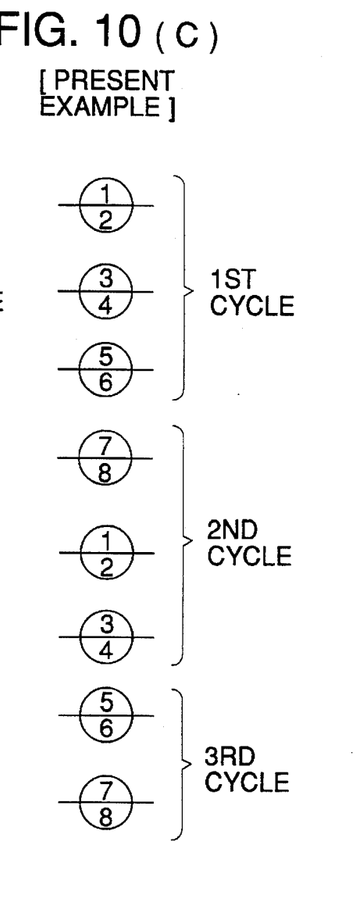

In the non-stacking type image recording apparatus, the maximum conveyance number of transfer sheets, which can exist in the reversing path in the reversing section, is determined depending on the apparatus, and when the maximum conveyance number of the transfer sheets is assumed to be one cycle, image processing is carried out per cycle. When a plurality of copying volume are copied, one copying volume has been completed such that only remaining copying sheets of the transfer sheets, which exceed the maximum conveyance number while one copying volume is outputted, are conveyed, and in the next copying cycle, the transfer sheet is conveyed from the first page of image data of the copying volume. This is shown in prior art in FIG. 10(B). In FIGS. 10(A), 10(B) and 10(C), the maximum conveyance number per cycle is 3, and 8 pages image data are outputted.

Further advantages of this stackless (non-stacking) type apparatus is as follows. The transfer sheets are always nipped by conveyance rollers, and therefore jamming frequency is greatly reduced. The transfer sheets are continuously fed and conveyed, and therefore the copy productivity is not decreased.

However, the following are problems caused by the stackless type apparatus. The front and the rear surfaces of the transfer sheets are continuously processed by feeding→image formation→reversed circulating→image formation→sheet delivery, and therefore, when a transfer sheet is delayed in the conveyance path from the sheet feed section, or in the circulating reversing sheet feeding path, the reliability of control of the conveyance path or circulating reversing sheet feeding path is deteriorated, in such a manner that the succeeding transfer sheet catches up with the preceding transfer sheet, or the like.

SUMMARY OF THE INVENTION

The first object of the present invention is to improve the conventional transfer sheet conveyance method, and to provide an image recording apparatus having higher copying productivity.

The second object of the present invention is to make the best use of the advantages of the non-stacking type apparatus, and to provide an image forming apparatus by which the reliability of the transfer conveyance is enhanced.

The first embodiment of the image recording apparatus to attain the above-described object, is structured as follows. An image recording apparatus comprises: a memory means for storing the image information of each page; an image forming means for reading the image information from the memory means for each page, and for recording it onto the transfer sheet; a transfer sheet conveyance means for conveying a transfer sheet to the image forming means to record an image on one side thereof, and after that, conveying again the transfer sheet to the image forming means to record an image on another side thereof, with no transfer sheets being stacked during conveyance, and the transfer sheet being conveyed along a specified conveyance path; and a control means for controlling the image forming means and the transfer sheet conveyance means so that the following cycle is repeated until the completion of the image formation, when image formation of the maximum conveyance number of the transfer sheets, which can exist in the conveyance path, by the image forming means is assumed as 1 cycle, wherein the maximum conveyance number of transfer sheets always exist in the conveyance path in each cycle, except the cycle during which the image formation is completed.

The second embodiment of the present invention is structured as follows:

The image recording apparatus according to the first embodiment, wherein the image recording apparatus further comprises a document reading means for reading the document and outputting the image information, and the thus read image information is stored in the memory means.

The third embodiment of the present invention is structured as follows:

The image recording apparatus according to the first embodiment, wherein the transfer sheets are continuously conveyed, keeping a predetermined interval during image formation.

The fourth embodiment of the present invention is structured as follows:

In the first embodiment, the control means controls the image forming means so that image information is read from the memory means, assuming that the image information of 2 times of the pages of the maximum number of conveyance sheets as 1 cycle.

The fifth embodiment of the present invention is structured as follows:

In the fourth embodiment, the control means determines the reading sequence of the image information from the memory means by separating the image information into one side recording information and another side recording information.

The sixth embodiment of the present invention is structured as follows:

In the first embodiment, the conveyance means has a portion for reversing the transfer sheet, (turning it upside down), in the conveyance path.

The seventh embodiment of the present invention is structured as follows:

In the first embodiment, the conveyance means comprises: a stopping means for temporarily stopping the transfer sheet in the conveyance path, wherein the transfer sheet, which is temporarily stopped by the stopping means, is controlled so that its conveyance is re-started according to conveyance conditions of the preceding transfer sheet.

The eighth embodiment of the present invention is structured as follows:

In the seventh embodiment, the transfer sheet, which is temporarily stopped by the stopping means, is controlled so that its conveyance is re-started according to conveyance conditions of the succeeding transfer sheet.

The ninth embodiment of the present invention is structured as follows:

In the seventh embodiment, the control means stops the operations of the image recording apparatus according to conveyance conditions of the transfer sheet subsequent to the transfer sheet which is temporarily stopped.

The tenth embodiment of the present invention is structured as follows:

In the seventh embodiment, conveyance conditions of the transfer sheets are detected by a detection means arranged in the conveyance path.

The eleventh embodiment of the present invention is structured as follows:

In the seventh embodiment, the conveyance means reduces the conveyance speed of the transfer sheet near the image forming means.

The twelfth embodiment of the present invention is structured as follows:

In the seventh embodiment, the conveyance means has a portion to reverse (turn upside down) the transfer sheet in the conveyance path.

The thirteenth embodiment of the present invention is structured as follows:

In the twelfth embodiment, the stopping means temporarily stops the transfer sheet downstream of the reversing portion in the conveyance path.

The fourteenth embodiment of the present invention is structured as follows:

In the thirteenth embodiment, the conveyance means conveys the transfer sheet so that the out-going speed of the transfer sheet from the reversing portion is greater than the entering speed of the transfer sheet into the reversing portion.

The fifteenth embodiment of the present invention is structured as follows:

In the fourteenth embodiment, the transfer sheet is switched-back in the reversing portion.

DETAILED DESCRIPTION OF THE PREFERRED EMBODIMENT

Figure 1:
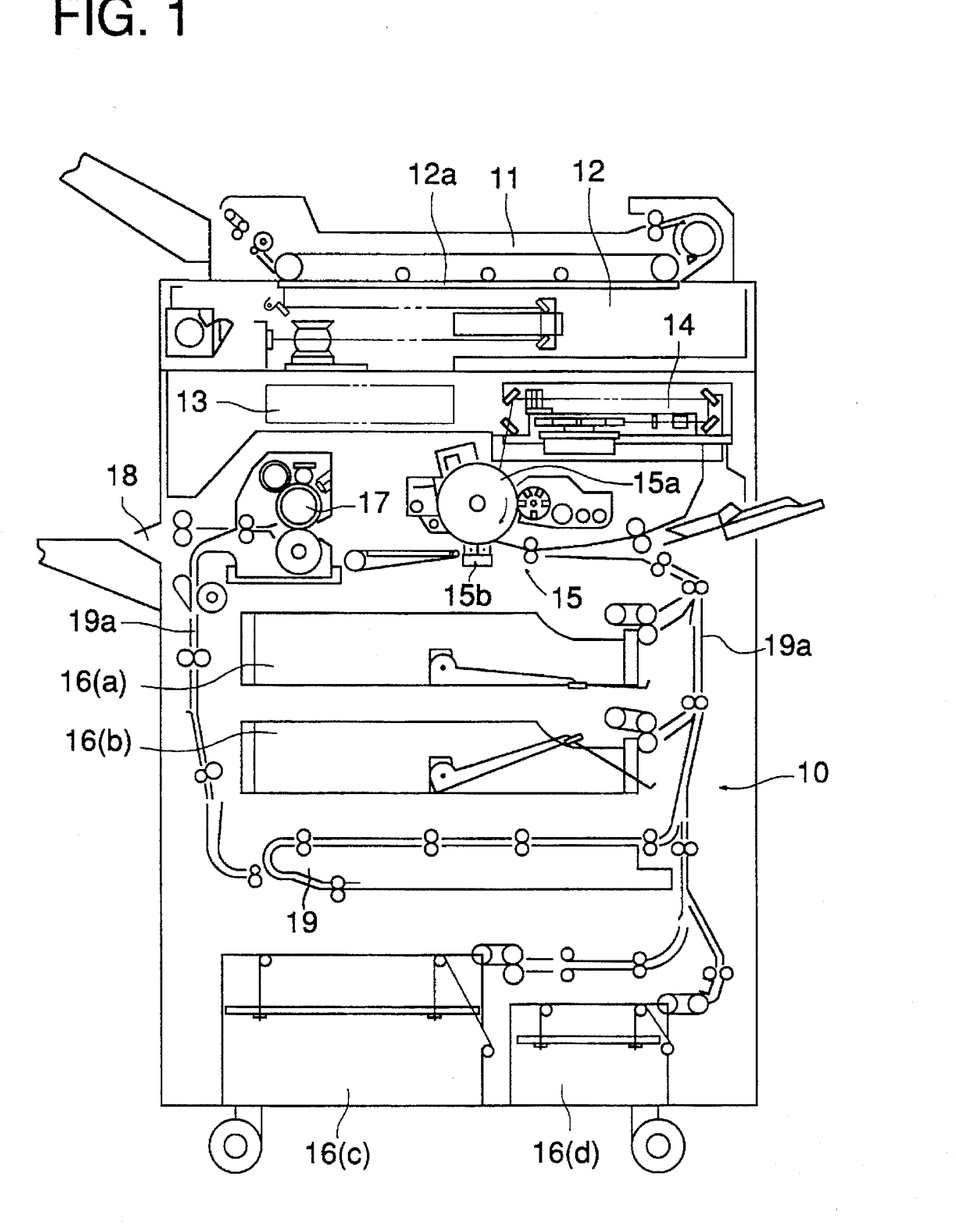
FIG. 1 is a view showing the structure of an example of an image recording apparatus of the present invention.
Figure 2:
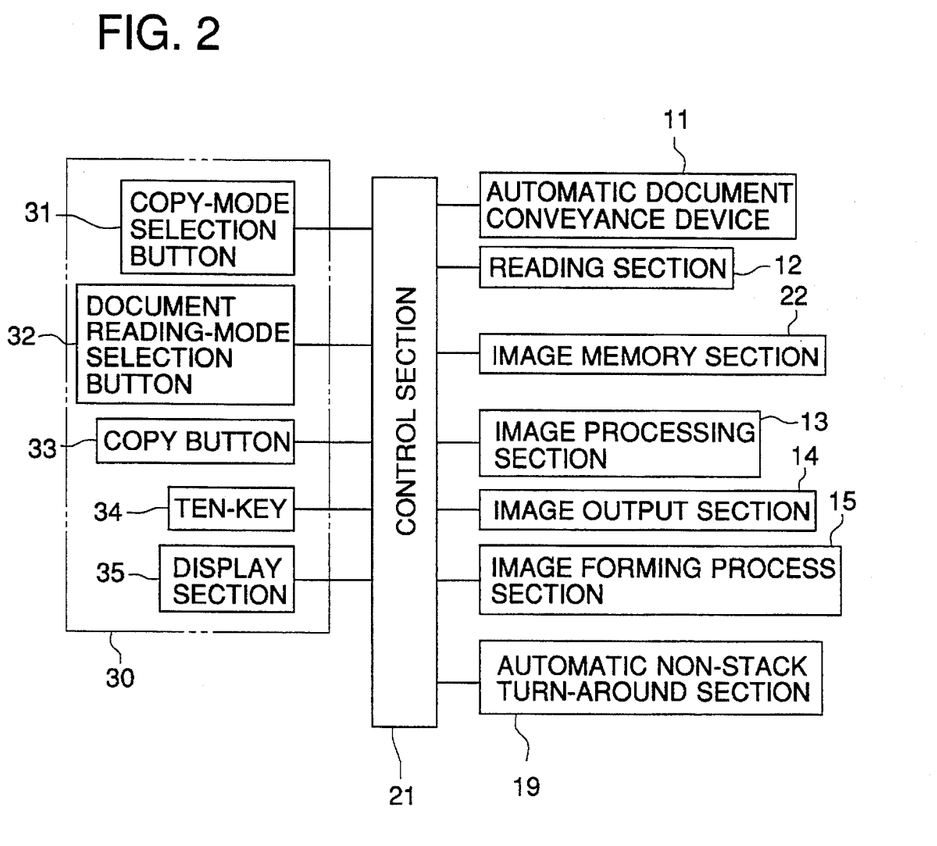
FIG. 2 is a block diagram showing a main control system of the image recording apparatus of the present invention.

FIG. 1 is a view showing a structure of an example of an image recording apparatus of the present invention. FIG. 2 is a block diagram showing the circuit composition. An automatic document conveyance device 11 is mounted on the upper surface of an image recording apparatus main body 10. In the automatic document conveyance device 11, a document sheet is taken from documents stacked on the upper portion of the device 11, and sent onto a platen glass 12a through which a document image is read. This automatic document conveyance device 11 can turn the document so that both sides of the document sheet are reversed, and automatically convey the document onto the platen glass 12a. The automatic document conveyance device 11 will be detailed later.

Numeral 12 is a reading section, composed of a moving mirror, an image forming optical system, and a light receiving element such as a CCD, or the like. This section 12 scans a document placed on an exposure position on the platen glass. The light receiving element such as a CCD or the like, positioned at the image forming position, reads the image information of the document, and the image information is outputted as an image signal. Numeral 13 is an image processing section in which the image signal outputted from the reading section 12 is converted and processed into a recording signal, appropriate for laser recording. Recording signals for every page are temporarily stored in an image memory section 22. Numeral 14 is an image output section, in which a laser optical system, which is emitted by stored signals read from the image memory section 22, optically scans the rotating photoreceptor drum 15a, and forms a latent image.

An image forming processing section 15 composed of a photoreceptor drum 15a, a charger, developing units, and the like, provided around the photoreceptor drum 15a, develops the latent image into a toner image. The toner image is transferred onto a transfer sheet, which is sent from any of sheet feeding sections 16(a), 16(b), 16(c) and 16(d), and fed in timed relationship with the system, in a transfer and separation section 15b. The transfer sheet is separated from the photoreceptor drum 15a and guided to a fixing unit 17. The transfer sheet, on which the toner image is maintained, is fixed by the fixing unit 17, and after that, the transfer sheet, on one side of which the image is fixed, is delivered from a sheet delivery section 18 when the operation mode is in the single-side copy mode.

Further, when the operation mode is in the double-sided copy (ADU) mode, the transfer sheet with an image on one side, on which the toner image has been fixed by the fixing device 17, is turned upside down in a non-stacking, automatic turning section (ADU) 19. After that, a toner image is transferred onto the other side of the transfer sheet in the image forming processing section 15, the toner image adhered onto the other side of the transfer sheet is fixed in the fixing section 17, and then the transfer sheet is delivered from a delivery section 18. Although not shown in the drawing, a finisher for finishing operations such as stapling or the like, is provided in the sheet delivery section 18, and staple processing can be carried out for each set of a plurality of delivered transfer sheets.

A plurality of sheet detection means 25 are provided along the conveyance path of the transfer sheet, and thereby the existence of the transfer sheet, which is being conveyed, is detected. An operation panel 30, which is not shown in the drawing, is provided on the upper surface of the image recording apparatus main body 10. A reading-mode selection button 32 by which the document reading-mode of single-sided or double-sided document is selected, a copy mode selection button 31 by which a single-side copy or double-side copy is selected, a copy button 33 which is pressed at the start of copying operation, a ten-key 34 which sets and inputs the copy sets to be copied, and a display section 35 using a liquid crystal or the like, are provided on the operation panel 30. These buttons and section are connected to a control section 21.

In image recording apparatus, so-called high speed processing, a large number of sheets are copied in a predetermined period of time, is carried out. The transfer sheets are continuously conveyed while a specific interval is being maintained between transfer sheets, and images are recorded onto the transfer sheets. Accordingly, in the double-sided copy mode, for example, A4-sized transfer sheets, on one side of which an image has been fixed, the maximum conveyable number of N (for example, 3 sheets) of which exist on the circulated and reversed conveyance path formed by the transfer and separation section 15b, and the ADU conveyance path 19a. As shown in the drawing, the transfer sheets are conveyed counterclockwise in the apparatus, and the image is recorded at 1 cycle per every maximum conveyance number of sheets N.

Relating to the above-described image recording apparatus, an example of the present invention will be described below.

EXAMPLE

Figure 3:
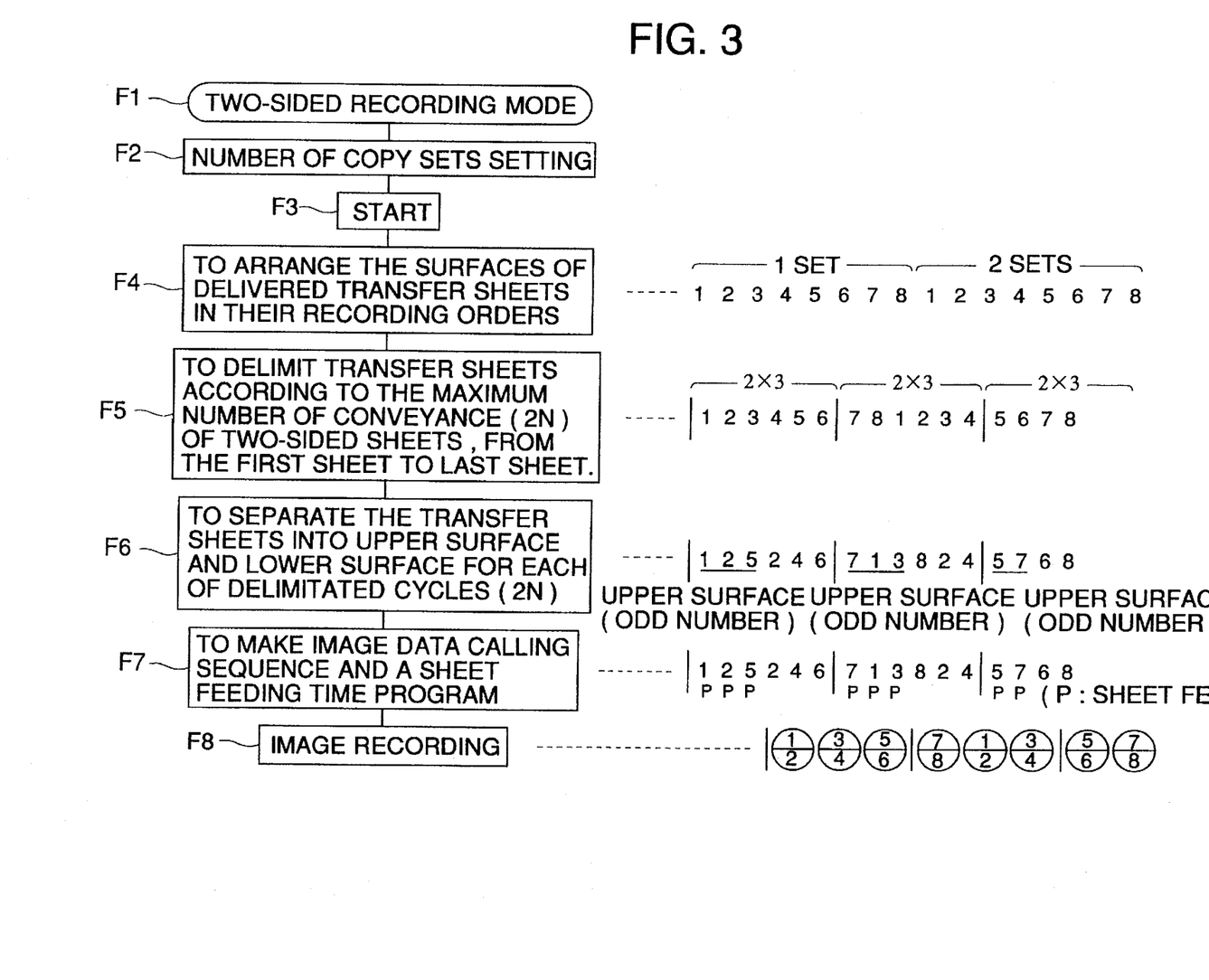
FIG. 3 is a flow chart at the time of selection of the double-sided recording mode in this example of the present invention.

A flow chart of the present invention is shown in FIG. 3. As a specific example, a case in which the maximum number of conveyance sheets N per cycle=3, the number of pages of image data to be recorded is 8, and the number of copy sets is 2, will be described below. The double-sided recording mode is set by a copy mode selection button 31 on the operation panel 30 (F1), and the number of copy sets is set by the ten-key 34 (F2), and then, when a copy button is pressed (ON) (F3), the document on the automatic document conveyance device 11 is automatically conveyed to the reading section. Document information is read (scanned) in the reading section 12, and after the image has been processed in the image processing section 13, the image is stored in the image memory section 22. It is checked by the apparatus whether or not the entire documents have been scanned, and after confirmation that the entire documents have been scanned, the copying operation starts. That is, image information of the document stored in the image memory section 22 is read, a latent image is formed on the photoreceptor drum 15a by an image output section 14, and double-sided copying is carried out by an image forming processing section 15 according to the number of copy sets inputted.

In the image recording apparatus of the present invention, the control section 21 operates the following operations subsequent to the above-described F3.

Initially, the recording number of the entire copy sets is arranged in the sequence of recording surface on the recording sheets to be delivered (F4). Next, the maximum sheet conveyance number (2N) for double-sided copy is sequentially delimited from the top of recording number (F5). The recording number is separated into an odd number and an even number for each of the delimited cycles (2N), and the arrangement sequence is changed to the upper surface and the lower surface (F6). Next, the reading sequence of image data and the sheet feed time program are set. That is, when image data corresponding to the upper surface of the recording sheet is read, a latent image is formed on the photoreceptor drum 15a based on image data corresponding to the read-out recording number. The control of the image output section 14 and setting of the sheet feed time program are carried out so that a developed toner image is transferred onto the transfer sheet in the transfer and separation section 15b (F7). The control section 21 carries out image recording according to the program set as described above (F8).

When images are recorded according to the above-described flow chart, the images are recorded in a status in which all transfer sheets are conveyed in the maximum conveyance sheet number, in each copy cycle, except the last copy cycle. Accordingly, the number of copying sheets per unit of time is increased in the double-sided recording mode (refer to FIG. 10(C)), and especially when the number of copy sets is large, advantages of the apparatus become more conspicuous.

The movement sequence of a document in the conventional automatic document conveyance apparatus is as follows:

> reversal sheet feeding→(reading)→reversed (turned upside down)→(reading)→sheet delivery.

The movement sequence of the document in the present example is as follows:

> sheet feeding→(reading)→reversed (turned upside down)→(reading)→reversal sheet delivery.

That is, in this example, the number of reversing time of the document until the second reading of the document has completed is reduced by 1 as compared to the conventional example, and therefore the time for completion of reading can be reduced, resulting in enhancement of copy productivity at the time of double-sided document reading.

For example, in the case of a single document sheet, the number of times of reversing operations of the document is only one until reading has been completed. In case of a plurality of documents, since the next document sheet feeding can be started during document reversing for delivery, the copy productivity can be increased. Of course, the reading-out sequence of image data is different from the reading-in sequence. An example of this sequence is shown in FIGS. 11(A), 11(B) and 11(C).

The reading-out sequence of the image data, once stored in the memory, is different from the reading-in sequence. However, this difference of the reading-out sequence from the reading-in sequence does not affect copy productivity. In this example, when the double-sided document reading-out mode, in which both sides of the document are read in the automatic document conveyance device, is set, the double-side recording mode is automatically selected for the transfer sheet, resulting in an increase of copy productivity. However, even after this automatic setting of the reading mode, it can also be manually changed to the single-side recording mode.

Figure 4:
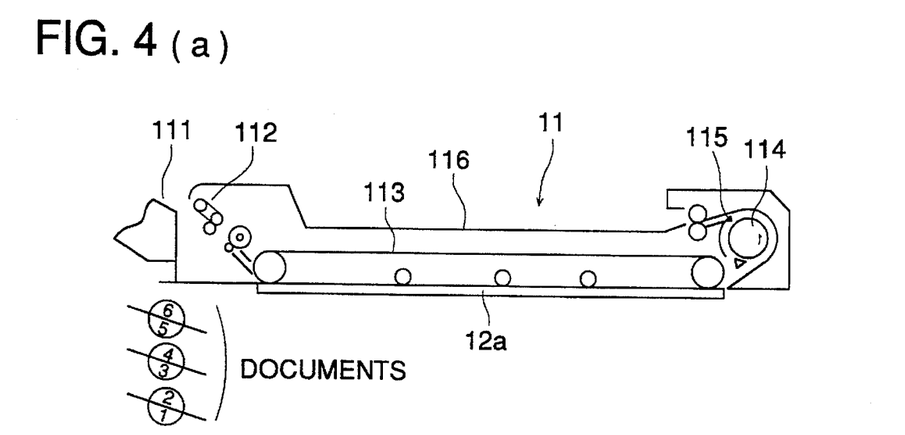
FIGS. 4(a) and 4(b) are illustrations of an automatic document conveyance device in this example of the present invention.
FIG. 4(c) is an illustration showing the conventional movement of documents.

FIG. 4(a) shows the automatic document conveyance device shown in FIG. 1. In FIG. 4(a), numeral 111 is a document placement section, numeral 112 is a document feeding section by which a document sheet is taken from the document placement section 111 and fed, numeral 113 is a conveyance belt which is rotated and reversely rotated, and by which the document is fed to or conveyed from the reading position, and numeral 114 is a reversing sheet delivery roller which is rotated counterclockwise in the drawing and by which the document is turned upside down or delivered. Numeral 115 is a switching member which is provided in the document conveyance path and by which the document is switched to be turned or delivered, and numeral 116 is a tray on which delivered documents are stacked.

Figure 11:
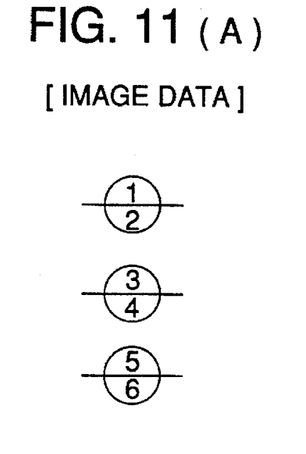
FIGS. 11(A), 11(B) and 11(C) are views comparing the conventional mode to the mode of the example of the present invention in the reading-in sequence and reading-out sequence of image data.

FIG. 4(b) shows movement of the document, according to the present invention (refer to FIG. 11(C)). As shown in FIG. 4(a), the documents (3 sheets of double-sided documents are shown in the drawing) are placed, being turned upside down, on the document placing section 111. The uppermost document sheet is separated in the document feed section 112, fed to the reading position on the platen glass 12a, and temporarily stopped for reading. At this time, the fifth surface is read. Next, the document is moved in the right direction, and turned upside down by the reverse delivery sheet roller 114. The document is returned again to the reading position on the platen glass 12a, and read. At this time, the sixth surface is read. Next, the document moves in the right direction, is turned and returned, after which the switching member 115 is switched and the document is delivered onto the tray 116.

The reason for the document being turned before the delivery of the document is as follows: the stacked sequence of the document, delivered onto the tray 116 and superimposed on other documents, is the same as the sequence of the documents initially placed on the document placement section 111. That is, the conveyance of the document according to the present invention is carried out as follows: document sheet feeding—reading—turning upside down—reading—reversed sheet delivery. The document reading sequence (5, 6 in the example) is different from the image reading sequence (6, 5 in the example).

Figure 5:
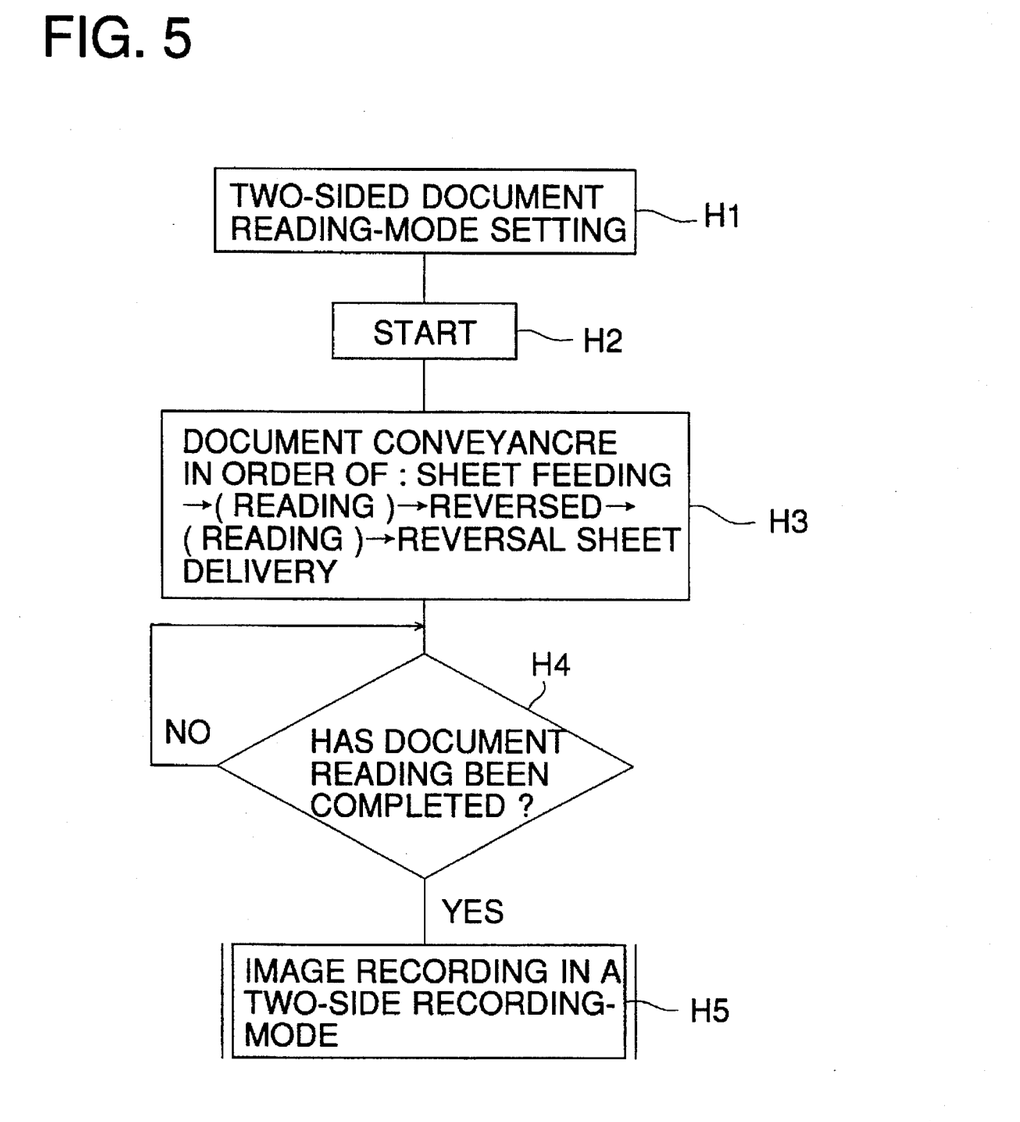
FIG. 5 is a flow chart at the time of selection of the reading mode of double-sided documents in this example of the present invention.

A flow chart of the present invention is shown in FIG. 5. A double-sided document reading mode is set by a reading mode selection button 32 (H1). When a copy button 33 is pressed (H2), the documents placed on the document placement section 111 are separated one by one sheet, and each document sheet is conveyed and read in the following sequence (H3); a document sheet feeding—(reading)—turning—(reading)—reversed sheet delivery. During these operations, it is checked whether or not the document reading has been completed (H4). When the completion of the document reading is detected, image recording is automatically carried out in the double-sided recording mode (H5). In this example, when the double-sided document reading mode is set by the reading mode selection button 32, a display section according to a copy mode selection button 31 is automatically switched to the double-side copy mode, and after the completion of reading of the double-sided document, the double-side copying is performed. Generally, because the double-side copy can be obtained from double-sided document, the apparatus is greatly convenient. When single-side copy is required from a double-sided document, the single-side copy mode may be set by pressing the copy mode selection button 31 during reading of a double-sided document.

In the present invention, the document is read in sequence different from the sequence of image data reading. The number of documents turned before the completion of the second reading of the document, is smaller by 1 compared to that of the conventional document reading. Accordingly, timing of the completion of document reading can be shortened, so that the copying productivity is increased.

A conventional document reading operation will be described for a specific comparison below. FIG. 4(c) shows the movement of a conventional document. Initially, reversed sheet feeding of the document fed from the document placing section 111 is carried out, and after the document has once passed over the platen glass 12a, it returns to the reading position on the platen glass 12a, and the document is read. At this time, the sixth surface is read. Next, the document is moved in the right direction, reversed, and returns again to the reading position for the fifth surface reading. After this reading has been completed, the document is delivered onto the tray 116.

Figure 6:
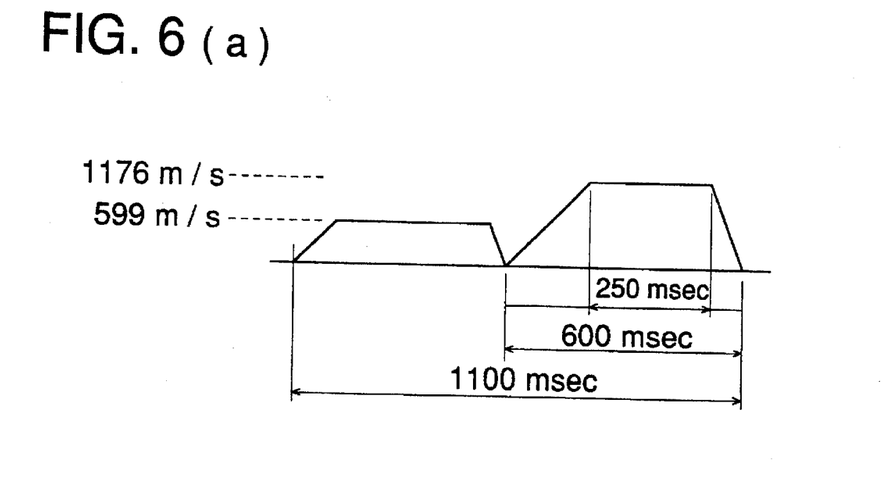
FIGS. 6(a), 6(b) and 6(c) are views of line speeds of the document in the automatic document conveyance device.

The processed operation of a single document has been described above. In the case of 2 documents, the second sheet is fed in parallel with the delivery of the document. In the present invention described in FIG. 4(b), the second sheet is fed at the same time as the reversed sheet delivery. In the conventional example described in FIG. 4(c), the reversed sheet feeding of the second sheet is carried out at the same time as the sheet delivery. FIGS. 6(a)–6(c) are diagrams showing the required time for these operations. In FIGS. 6(a)–6(c), the line speed is switched to two stages of 1176 m/s and 599 m/s for a A4-sized document. In cases when the sheet collides with the reversed sheet delivery roller 114, or correction of the sheet position at the time of document sheet feeding is required, the line speed is controlled to 599 m/s. The document reading time is 840 ms, and since this value is the same as in cases of the present invention and the conventional example, comparison of both cases is omitted, and only conveyance time is compared as follows. The conveyance method of the present invention is composed of FIG. 6(a) turning (turning upside down) and FIG. 6(b) reversed sheet delivery and sheet feeding. The conventional conveyance method is composed of FIG. 6(a) turning (turning upside down) and FIG. 6(c) sheet delivery and reversed sheet feeding.

The processing time of the present invention is compared with that of a conventional example, as follows.

The present invention=FIG. 6(a)+FIG. 6(b)=1100 msec+1500 msec=2600 msec

A conventional example=FIG. 6(a)+FIG. 6(c)=1100 msec+1700 msec=2800 msec

As can clearly be seen from the above relationships, the conveyance processing time per single document sheet is reduced by 200 msec in the present invention, and processing efficiency is thereby increased.

In the image recording apparatus in which double-sided copying can be performed, the present invention has advantages in increased copying productivity.

The number of transfer sheet conveyed in the reversal conveyance path in the double-sided copying mode is set to the maximum sheet conveyance number except the last copy cycle, and therefore, the more the number of copy sets is, the more the copying productivity is increased.

Further, the movement sequence of the document at the double-sided document reading mode in the automatic document conveyance apparatus, is performed without depending on the reading sequence of image data, and therefore the time, during which reading of the document has been completed, is reduced. On the other hand, even when the reading-out sequence of image data is different from reading-in sequence of the image data, it does not affect the processing time, so that the processing efficiency is increased.

Figure 7:
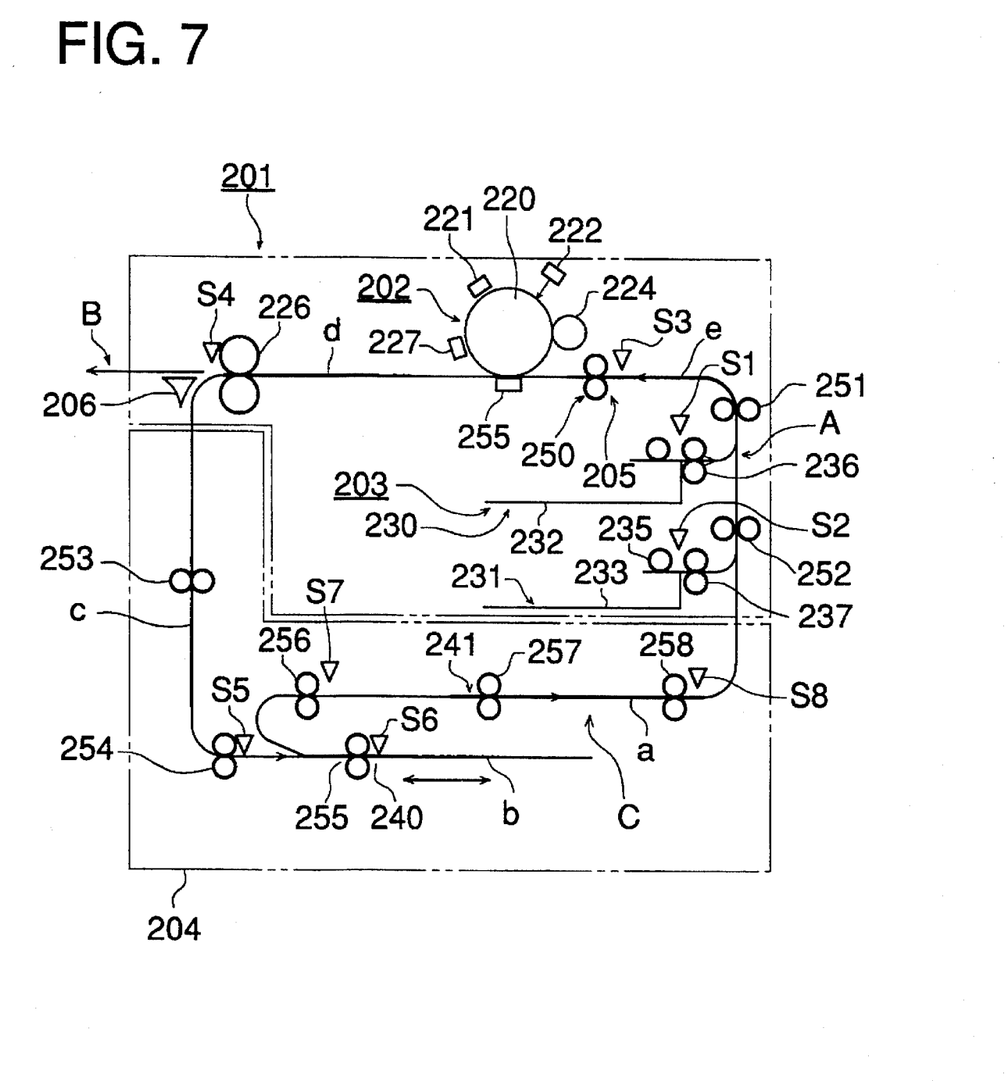
FIG. 7 is a view of the general structure of an image forming apparatus.
Figure 8:
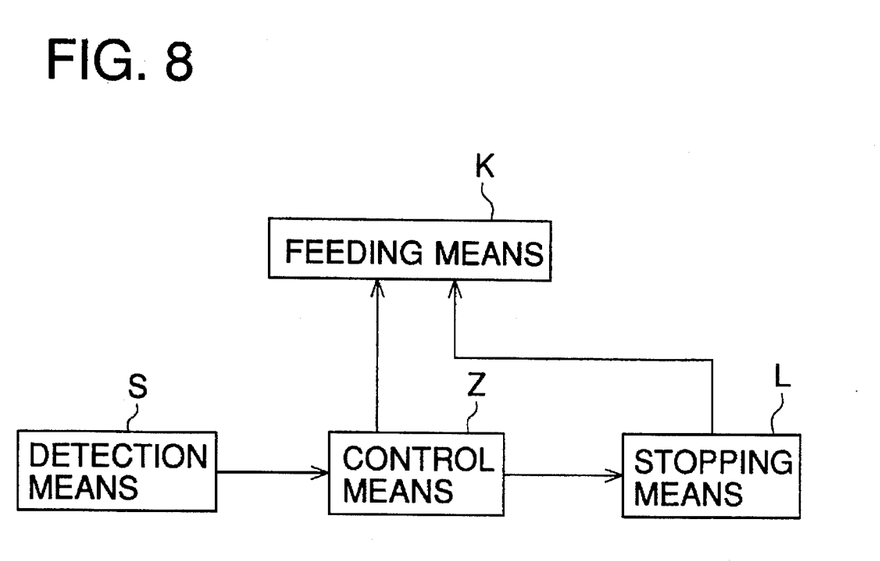
FIG. 8 is a block diagram of the control of the image forming apparatus.

Another embodiment of the image forming apparatus of the present invention will be described below. FIG. 7 is a view showing the outline structure of an image forming apparatus, and FIG. 8 is a control block diagram of the image forming apparatus.

In this example, a copier 201 is shown as an image forming apparatus. In this copier 201, an image forming section 202, a sheet feeding section 203 and a circulating sheet re-feeding section 204 are provided. The copier 201 includes a conveyance path A for conveying a transfer sheet to the image forming section 202, a sheet delivery path B for delivering the transfer sheet, on which an image is formed, outside the copier, and a circulating reversed sheet feeding path C for circulating the transfer sheet, on which the image is formed in the image forming section 202, again to the image forming section 202 after the transfer sheet has been reversed.

In the image forming section 202, a photoreceptor drum 220 as an image carrier is provided; the photoreceptor drum 220 is uniformly charged by a charging electrode 221; image information is irradiated on the peripheral surface of the photoreceptor drum 220 by a document exposure means 222; and an electrostatic latent image is formed. The electrostatic latent image is developed by a development section 224, and a toner image is thus formed. A conveyance roller 250 in the second sheet feeding section 205 is driven synchronously with the rotation of the photoreceptor drum 220, feeds the transfer sheet to a transfer section 225, and a toner image is thus transferred. After that, the transfer sheet is separated from the photoreceptor drum 220, and conveyed to a fixing section 226. A cleaning section 227 is provided around the photoreceptor drum 220, which cleans the surface of the photoreceptor drum 220 after the transferring operation, and again charges the photoreceptor drum surface by the charging electrode 221 for the next image formation.

The toner image is fixed on the transfer sheet which has been heated and pressed by a fixing unit 226. The conveyance path for the transfer sheet is switched to a delivery side or a re-transfer side by a switching gate 206 provided at the rear portion of the fixing section 226.

A plurality of sheet feed stage sections are provided in a sheet feed section 203, and in this example, an upper sheet feed stage section 230 and a lower sheet feed stage section 231 are provided. Trays 232 and 233, in which transfer sheets are respectively accommodated, are provided in the upper sheet feed section 230 and the lower sheet feed section 231. Sheet feed rollers 234 and 235 are provided on the upper surface of the transfer sheet respectively accommodated in sheet feed stage sections 230 and 231, and a transfer sheet is intermittently fed from each tray. Double feeding prevention rollers 236 and 237 are respectively provided at the front stage of sheet feed rollers 234 and 235, and feed the transfer sheets one by one to the next process. The transfer sheets are conveyed to the second sheet feed section 205 through conveyance rollers 251 and 252 respectively provided in the conveyance path A.

A circulation sheet re-feed section 204 is composed of a transfer sheet reversing section 240 and a horizontal conveyance section 241. When a switching gate 206 is switched to the re-transfer side, the transfer sheet is conveyed through the switching gate 206, and the conveyance rollers 253 and 254 to a transfer sheet reversing section 240. In the transfer sheet reversing section 240, the transfer sheet is reversed by reversely rotating a reversing roller 255. This reversed transfer sheet is sent to the horizontal conveyance section 241 through a conveyance roller 256, and sent to the conveyance path A by conveyance rollers 257 and 258 of the horizontal conveyance section 241.

In the sheet feed section 203, detection sensors S1 and S2 are provided at a rear stage of the sheet feed rollers 234 and 235. A detection sensor S3 is provided at a front stage of a conveyance roller 250 in the second sheet feed section 205. A detection sensor S4 is provided at a front stage of the fixing section 226. Further, detection sensors S5 and S6 are respectively provided at the front and the rear of the transfer sheet reverse section 240 in the circulation sheet re-feed section 204. Still further, detection sensors S7 and S8 are respectively provided at the front and the rear of the horizontal conveyance section 241. These sensors respectively detect the transfer sheet at these positions.

A detection means S is composed of detection sensors S1–S8, and detected information from this detection means S is sent to a control means Z. The control means Z controls a sheet feeding means K according to this detected information. The sheet feeding means K conveys the transfer sheet, and is composed of the conveyance roller 250, conveyance rollers 251 and 252, conveyance rollers 253 and 254, reversing roller 255, conveyance roller 256 and conveyance rollers 257 and 258, and the like. Electromagnetic clutches (not shown in the drawings) are respectively provided on these rollers, and a stopping means L is composed of these electromagnetic clutches.

In FIG. 7, a bold line portion shows positions of the transfer sheets a, b, c, d and e in a copier 201. It is controlled that the transfer sheet "a" does not catch up with the preceding transfer sheet "e", and is not caught up by the following transfer sheet "b".

The speed of respective conveyance roller 250, conveyance rollers 251 and 252, conveyance rollers 253 and 254, the reversing roller 255, the conveyance roller 256, and conveyance rollers 257 and 258 are set to the following values in order to secure required intervals between transfer sheets.

Conveyance rollers 250, 253, 254, the reversing roller 255 (normal rotation): 280 mm/sec     The reversing roller 255 (reverse rotation), conveyance rollers 256, 257, 258: 500 mm/sec     Sheet feed rollers 234, 235, conveyance rollers 251, 252, the conveyance roller 250: 550 mm/sec The control means Z detects conveyance conditions ahead and behind the transfer sheet according to detected information sent from detection sensors S1–S8, of which the detection means S is composed. The control means Z detects conveyance conditions at the front and rear of the transfer sheet located in the circulation reversed sheet feeding path, inactivates electromagnetic clutches of the conveyance rollers 257 and 258, and temporarily stops the transfer sheet "a". The temporary stopping time is changeable according to the detection of the conveyance conditions at the front and rear of the transfer sheet "a" to be temporarily stopped. When it is detected and judged that the preceding transfer sheet "e" is delayed, the stopping time is controlled to be extended. The limit of the extension of the stopping time is determined to be equal to the time at which the following transfer sheet "b" arrives at a predetermined position Further, when the stopping time is equal to the limit of the extension, temporary stop of the transfer sheet "a" is cancelled, and the sheet feeding starts again. Further, when the stopping time is equal to the limit of the extension, it is controlled that the apparatus is stopped due to faulty conveyance of the transfer sheet "a", and paper jamming alarm is activated.

Due to the control described above, the speed of the horizontal conveyance section 241 is increased more than that of the conventional type copier, and therefore, a control margin of the conveyance roller 250 and reversing roller 255, in which conventionally the control margin is not secured, can be secured. That is, in the reversing roller 255, the transfer sheet "a" passes more quickly through the reversing roller 255, an interval between the transfer sheets "a" and "b" is increased. In the conveyance roller 250, the transfer sheet "a" is fed only after the transfer sheet "e" is fed again, and therefore the transfer sheet "a" does not catch up with the transfer sheet "e".

A non-stacking method is adopted in this copier 1. The transfer sheet is not temporarily stacked in this copier, different from the conventional stack type copier in which the transfer sheet, one surface of which has been copied, is temporarily stacked. Accordingly, no loss of time occurs for the double-sided copying operation, and copy productivity is increased. Further, the transfer sheets are always gripped by rollers, and therefore, the occurrence of jamming due to curling of the transfer sheet, which tends to occur in the transfer section 226, can be prevented.

In this connection, because the transfer sheet is always moved without stopping, it is difficult to secure the control margin in a portion in which the movement of the transfer sheet fluctuates largely, when many transfer sheets are entered into the copier to its limit of the processing capacity. In this example of a copier, the portions of large fluctuations are the portions ranging from sheet feed rollers 234 and 235 of sheet feed stage sections 230 and 231 to the conveyance roller 250, and a portion at the front and the rear portions of the reversing roller 255. However, in this example, the control margin can be secured when a temporary stopping time is changed according to the detection of conveyance conditions at the front and the rear of the transfer sheet to be temporarily stopped. When the non-stacking type circulation sheet re-feeding section 4 is integrated with a page memory device in which a plurality of pages of image information can be stored, the performance for general purposes can be exhibited.

Figure 9:
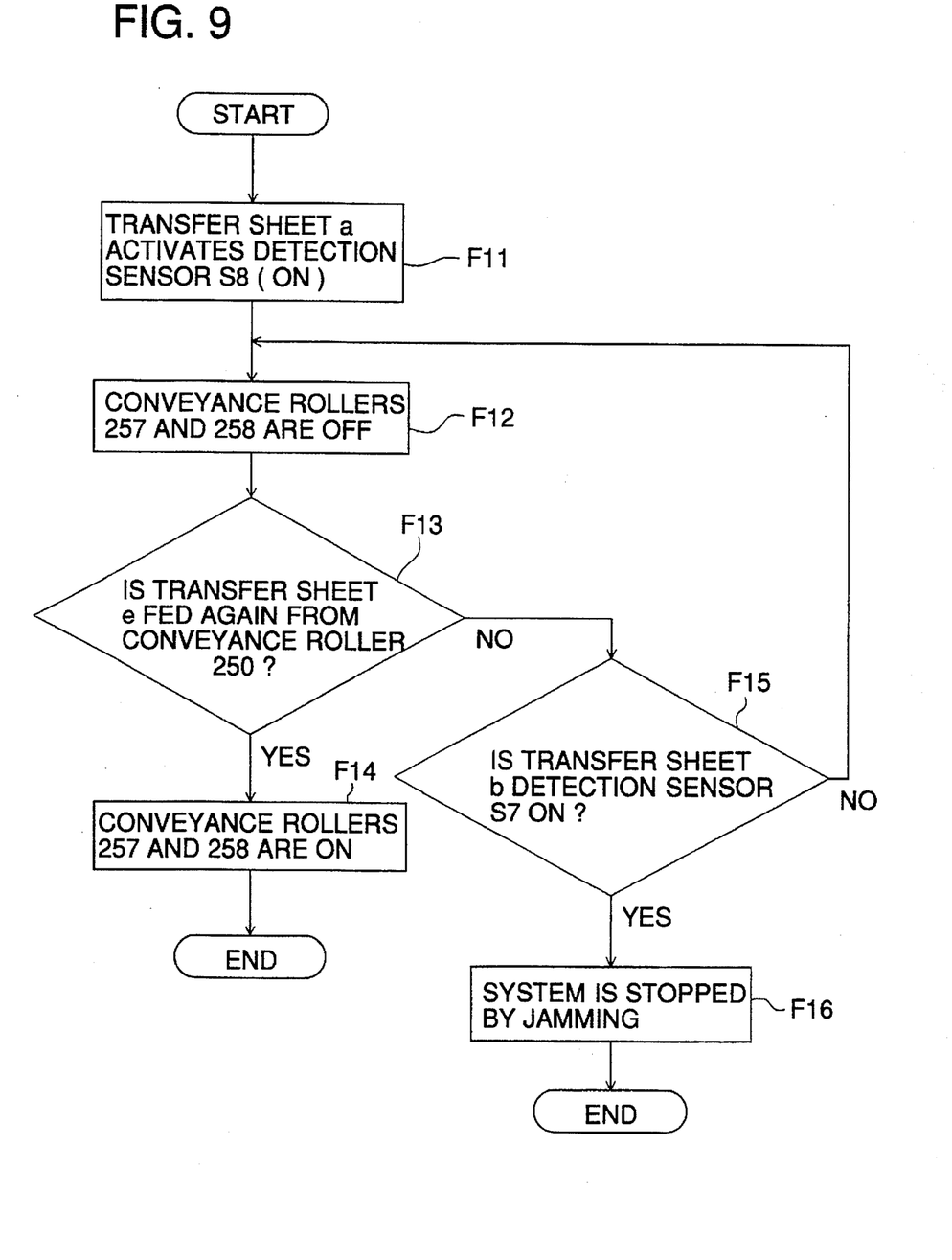
FIG. 9 is a flow chart at a conveyance roller portion in a circulation sheet re-feeding section.

Next, operations of the image forming apparatus will be described. FIG. 9 is a flow chart of the conveyance roller portion in the circulation sheet re-feeding section. An outline of operations when images are formed on both surfaces of the transfer sheet, will be described below (the number of copy sets is 10, the setting number of copied sheets is 1).

It is detected by the detection sensor S1 that the transfer sheet sent from the upper sheet feed stage section 230 is normally conveyed. The transfer sheet is conveyed through the conveyance path A, and collides with the conveyance roller 250. The transfer sheet is re-fed onto the photoreceptor drum surface 220 so that it is in timed relationship with an image signal sent from a laser, which is a light source 222, the image is formed onto the transfer sheet, and fixed in the fixing section 226.

When images are formed on both surfaces of the transfer sheet, initially the image is formed on only the even numbered surface. Accordingly, after the transfer sheet has been fixed in the fixing section 226, it is sent to the circulation reversed sheet feed path C through the switching gate 206 so that the transfer sheet is again guided to the sheet feed section. This operation is continuously conducted for 5 sheets so that all the even numbered surfaces are processed.

In the circulation sheet re-feeding section 204, when the leading edge of the transfer sheet is detected by the detection sensor S5, the reversing roller 255 is rotated in the normal direction in the drawing, and the transfer sheet is introduced into the transfer sheet reversing section 240. When the trailing edge of the transfer sheet is detected by the detection sensor S5, the reversing roller 255 is reversed after a predetermined time, and the transfer sheet is sent through the detection sensor S7 section to the horizontal conveyance section 241, composed of conveyance rollers 257 and 258.

When the leading edge of the transfer sheet "a" is detected by the detection sensor S8 (F11), the conveyance rollers 257 and 258 stop (F12). The transfer sheet waits the time at which the preceding transfer sheet "e" (the fifth transfer sheet sent from the upper sheet feed stage section 230) is re-fed from the conveyance roller 250, the conveyance rollers 257 and 258 are driven again at the time of the re-feeding (F14), and the transfer sheet is fed to the conveyance roller 250 so that images are formed on the odd numbered surfaces. When the preceding transfer sheet "e" is delayed between the upper sheet feed stage section 230 to the conveyance roller 250, the transfer sheet "a" waits at that position, and therefore, it prevents the transfer sheet "a" catching up with the transfer sheet "e".

On the other hand, while the transfer sheet "a" waits at the conveyance rollers 257 and 258, the following transfer sheet "b" is sent by the reversing roller 255 in the reverse direction. However, when the leading edge of the following transfer sheet "b" comes to the detection sensor S7 (F15), it becomes the time in which the transfer sheet "b" catches up with the transfer sheet "a". Accordingly, the apparatus is controlled in such a manner that the conveyance operation stops due to jamming or the like (F16).

As described above, when the temporarily stopping time is adjustable according to the detection of the conveyance conditions at the front and the rear of the transfer sheet, the control margin of the conveyance path is greatly increased, and delays at the front and the rear of the transfer sheet can also be appropriately adjusted, so that the reliability of the non-stacking type transfer sheet conveyance is increased.

Further, the stopping time is controlled to be longer when it is detected and judged that the preceding transfer sheet is delayed, and it can be appropriately controlled that the transfer sheet does not catch up with the preceding transfer sheet.

The limit of the expansion of the stopping time is equal to the time when the succeeding transfer sheet arrives at a predetermined position, and it can be appropriately controlled that the transfer sheet is not caught up by the succeeding transfer sheet.

When the limit of the expansion of the stopping time is reached, the temporarily stopping of the transfer sheet is cancelled, and sheet feeding operations start again, so that delays of the preceding or succeeding transfer sheets can be appropriately controlled.

When the limit of the expansion of the stopping time is reached, the system is controlled by assuming that faulty conveyance of the transfer sheet occurs, that is, operations of the apparatus can be stopped.

What is claimed is:

1. An image recording apparatus comprising:
   (a) a memory means for storing an image information of each page;
   (b) an image forming means for recording an image onto a recording sheet for each page on the basis of said image information in said memory means;
   (c) a sheet conveyance means for conveying a recording sheet to the image forming means to record an image on one side thereof, and then for conveying said recording sheet to the image forming means a second time to record an image on another side thereof,
   wherein the sheet is conveyed along a predetermined conveyance path without being stacked on the way of conveyance thereof and a predetermined maximum number of recording sheets can exist within said predetermined conveyance path; and
   (d) a control means for controlling the image forming means and the sheet conveyance means so that a cycle of an image forming operation corresponding to the maximum number of recording sheets is repeated until a remaining number of pages in said memory means to be recorded is less than the maximum number of recording sheets.

2. The image recording apparatus of claim 1 further comprising an original document reading means for reading an original document and for outputting said image information,
   wherein said image information is stored in said memory means.

3. The image recording apparatus of claim 1, wherein recording sheets are successively conveyed, keeping at least a predetermined interval between the sheets during an image forming operation.

4. The image recording apparatus of claim 1, wherein the control means controls the image forming means to read the image information corresponding to two times of the pages of the maximum number of recording sheets from the memory means for each said cycle.

5. The image recording apparatus of claim 4, wherein the control means controls to determine a reading sequence of the image information from the memory means by separating the image information into one side recording information and another side recording information for each said cycle.

6. The image recording apparatus of claim 1, wherein the sheet conveyance means comprises a portion provided in the conveyance path for reversing recording sheets.

7. The image recording apparatus of claim 1, wherein the conveyance means comprises a stopping means for temporarily stopping recording sheets in the conveyance path,
   wherein a recording sheet stopped by the stopping means is controlled to restart a conveyance thereof on the basis of a conveyance condition of a recording sheet which precedes the stopped recording sheet.

8. The image recording apparatus of claim 7, wherein the stopped recording sheet is controlled to restart the conveyance thereof on the basis of a conveyance condition of a recording sheet which succeeds the stopped recording sheet.

9. The image recording apparatus of claim 7, wherein the control means stops an operation of the apparatus on the basis of a conveyance condition of a recording sheet which succeeds the stopped recording sheet.

10. The image recording apparatus of claim 7 further comprising a detection means provided in the conveyance path for detecting the conveyance condition of recording sheets.

11. The image recording apparatus of claim 7, wherein the control means controls the conveyance means to reduce a conveyance speed of the recording sheet in the vicinity of the image forming means.

12. The image recording apparatus of claim 7, wherein the sheet conveyance means comprises a portion provided in the conveyance path for reversing recording sheets.

13. The image recording apparatus of claim 12, wherein the stopping means temporarily stops the recording sheet downstream of the reversing portion in the conveyance path.

14. The image recording apparatus of claim 13, wherein the conveyance means conveys the recording sheet so that an out-going speed of the recording sheet from the reversing portion is greater than an entering speed of the recording sheet into the reversing portion.

15. The image recording apparatus of claim 14, wherein the recording sheet is switched back at the reversing portion.

* * * * *